(12) United States Patent
Kuriyama et al.

(10) Patent No.: US 8,467,130 B2
(45) Date of Patent: Jun. 18, 2013

(54) RETARDATION FILM, METHOD OF PRODUCING THE SAME AND DISPLAY DEVICE

(75) Inventors: Akito Kuriyama, Tokyo (JP); Hiroshi Tazawa, Miyagi (JP); Keitaro Kitada, Miyagi (JP); Kei Obata, Miyagi (JP); Junichi Inoue, Tochigi (JP)

(73) Assignee: Sony Corporation, Tokyo (JP)

( * ) Notice: Subject to any disclaimer, the term of this patent is extended or adjusted under 35 U.S.C. 154(b) by 264 days.

(21) Appl. No.: 13/077,341

(22) Filed: Mar. 31, 2011

(65) Prior Publication Data
US 2011/0249333 A1    Oct. 13, 2011

(30) Foreign Application Priority Data
Apr. 7, 2010   (JP) ................. P2010-088762

(51) Int. Cl.
*G02B 5/30*   (2006.01)

(52) U.S. Cl.
USPC ...................................... 359/489.07

(58) Field of Classification Search
None
See application file for complete search history.

(56) References Cited

FOREIGN PATENT DOCUMENTS
JP          3360787          10/2002

*Primary Examiner* — Derek S Chapel
(74) *Attorney, Agent, or Firm* — K&L Gates LLP (57) ABSTRACT

A retardation film is provided and is formed by laminating a thermoplastic norbornene resin film, an anchor layer, an alignment film and a phase difference layer in this order. In this retardation film, the anchor layer is formed by applying an anchor material including a tri-, or more-functional acrylate monomer of 50 parts by weight or more and 90 parts by weight or less onto the thermoplastic norbornene resin film and then, drying and curing the anchor material with ultraviolet light.

8 Claims, 5 Drawing Sheets

| | RESIN 1 | RATIO BY WEIGHT | FUNC-TIONAL GROUP | RESIN 2 | RATIO BY WEIGHT | FUNC-TIONAL GROUP | RESIN 3 | RATIO BY WEIGHT | FUNC-TIONAL GROUP | ADHE-SION |
|---|---|---|---|---|---|---|---|---|---|---|
| EXAMPLE 1 | PENTAERY-THRITOL TRIACRYLATE (M-305) | 60 | 3 OR MORE | POLYESTER ACRYLATE (M-9050) | 20 | 3 OR MORE | UV URETHANE ACRYLATE OLIGOMER (UV7605B) | 20 | 3 OR MORE | ○ |
| EXAMPLE 2 | PENTAERY-THRITOL TRICRYLATE (M-306) | 60 | 3 OR MORE | POLYESTER ACRYLATE (M-8060) | 20 | 3 OR MORE | UV URETHANE ACRYLATE OLIGOMER (UV7630B) | 20 | 3 OR MORE | ○ |
| EXAMPLE 3 | PENTAERY-THRITOL TETRAACRYLATE (M-451) | 60 | 3 OR MORE | POLYESTER ACRYLATE (M-8030) | 20 | 3 OR MORE | UV URETHANE ACRYLATE OLIGOMER (UV7550B) | 20 | 3 OR MORE | ○ |
| COMPARA-TIVE EXAPLE 1 | DICYCLOPENTE-NYLOXYETHYL ACRYLATE (FA-512A) | 60 | 1 | 1,3-BUTYLENE GLYCOL DIACRYLATE (SR212) | 40 | 2 | — | — | — | × |
| COMPARA-TIVE EXAMPLE 2 | TETRAHYDRO-FURFURYL ACRYLATE (SR285) | 60 | 1 | 1,3-BUTYLENE GLYCOL DIACRYLATE (SR212) | 20 | 2 | UV URETHANE ACRYLATE OLIGOMER (UV7605B) | 20 | 3 OR MORE | × |
| COMPARA-TIVE EXAMPLE 3 | OCTYL/DISILL ACRYLATE (SR484) | 60 | 1 | POLYESTER ACRYLATE (M-9050) | 20 | 3 OR MORE | UV URETHANE ACRYLATE OLIGOMER (UV7605B) | 20 | 3 OR MORE | × |

FIG. 3

| NUMBER OF FUNCTIONS OF RESIN 1 | ADHESION | DIMENSIONAL CHANGE RATE |
|---|---|---|
| 1 FUNCTION | × | ○ |
| 2 FUNCTION | × | ○ |
| 3 FUNCTION | ○ | ○ |
| 4 FUNCTION | ○ | ○ |
| 5 FUNCTION | ○ | × |

FIG. 4

| ANCHOR LAYER FILM THICKNESS ($\mu$m) | ADHESION | DIMENSIONAL CHANGE RATE (%) |
|---|---|---|
| 0.5 | ○ | ○ (−0.002) |
| 2.0 | ○ | ○ (−0.003) |
| 3.5 | ○ | ○ (−0.007) |
| 5.0 | △ | △ (−0.011) |
| 7.5 | △ | △ (−0.014) |
| 10.0 | × | × (−0.020) |

RETARDATION FILM, METHOD OF PRODUCING THE SAME AND DISPLAY DEVICE

CROSS REFERENCES TO RELATED APPLICATIONS

The present application claims priority to Japanese Patent Application JP 2010-088762 filed on Apr. 7, 2010, the entire contents of which is hereby incorporated by reference.

BACKGROUND

The present disclosure relates to a retardation film having optical anisotropy and a method of producing the same. The present disclousre also relates to a display device provided with the retardation film having optical anisotropy.

In related art, as a stereoscopic image display device of a type using polarizing glasses, there is a device that emits polarized light varying between pixels for the left eye and pixels for the right eye. Such a display device makes it possible for a viewer wearing the polarizing glasses to view a stereoscopic image, by causing light emitted from the pixels for the left eye to enter only the left eye and light emitted from the pixels for the right eye to enter only the right eye.

For example, in Japanese Patent No. 3360787, a retardation film is used to emit light in polarization varying between the pixels for the left eye and the pixels for the right eye. In this retardation film, a phase difference region having a slow axis or a fast axis in one direction is provided for the pixels for the left eye, and a phase difference region having a slow axis or a fast axis in a direction different from that of the above-mentioned phase difference region is provided for the pixels for the right eye.

Incidentally, when affixing the retardation film described above to a display surface of a display panel, it is necessary to align the phase difference regions with the pixels of the display panel. Generally, a glass substrate is used for both the retardation film and the display panel, and expansion and shrinkage of the retardation film and the display panel due to an external environment hardly occur. Therefore, when the retardation film and the display panel are produced so that the pitch of the phase difference region and the pitch of the pixel agree with each other beforehand, there is no possibility that misalignment between the phase difference regions and the pixels will occur.

However, when a resin film is used as a base of the retardation film, the resin film may expand or shrink due to an external environment. Thus, it is conceivable to use, as the base of the retardation film, a thermoplastic norbornene resin film with extremely high dimensional stability. However, there is such a problem that this resin film has low adhesion with other resins and thus is not suitable for the base of the retardation film.

In view of the foregoing, firstly, it is desirable to provide a retardation film using a thermoplastic norbornene resin film as a base, and a method of producing the same. Secondly, it is desirable to provide a display device with such a retardation film.

SUMMARY

According to an embodiment, there is provided a retardation film formed by laminating a thermoplastic norbornene resin film, an anchor layer, an alignment film and a phase difference layer in this order. In this retardation film, the anchor layer is formed by applying an anchor material including a tri-, or more-functional acrylate monomer of 50 parts by weight or more and 90 parts by weight or less onto the thermoplastic norbornene resin film and then, drying and curing the anchor material with ultraviolet light.

A display device according to another embodiment includes a display panel in which plural pixel electrodes are arranged in rows and columns, and a retardation film affixed to the display panel. The retardation film included in this display device has the same elements as those of the above-described retardation film.

In the retardation film and the display device according to the above-described embodiments, the anchor layer formed as described above is provided between the thermoplastic norbornene resin film and the alignment film. As a result, the anchor layer adheres to the thermoplastic norbornene resin film firmly and therefore, even when the alignment film is made of a material that does not easily adhere to the thermoplastic norbornene resin film, the alignment film can be caused to firmly adhere to the thermoplastic norbornene resin film via the anchor layer.

A method of producing a retardation film according to another embodiment includes the following two steps.

(A) A first step of forming an anchor layer by applying an anchor material including a tri-, or more-functional acrylate monomer of 50 parts by weight or more and 90 parts by weight or less onto the thermoplastic norbornene resin film and then, drying and curing the anchor material with ultraviolet light.

(B) A second step of forming an alignment film and a phase difference layer in this order on the anchor layer.

In the method of producing the retardation film according to this embodiment, after the anchor layer is formed on the thermoplastic norbornene resin film as described above, the alignment film and the phase difference layer are formed. As a result, the anchor layer adheres to the thermoplastic norbornene resin film firmly and therefore, even when the alignment film is made of a material that does not easily adhere to the thermoplastic norbornene resin film, the alignment film can be caused to firmly adhere to the thermoplastic norbornene resin film via the anchor layer.

According to the retardation film, the method of producing the same, and the display device according to the above-described embodiments, the alignment film is caused to firmly adhere to the thermoplastic norbornene resin film via the anchor layer. As a result, it is possible to reduce peeling of the alignment film and a great change in the dimension of the retardation film. Therefore, a retardation film using a thermoplastic norbornene resin film as a substrate can be realized.

Additional features and advantages are described herein, and will be apparent from the following Detailed Description and the figures.

DETAILED DESCRIPTION

An embodiment will be described below in detail with reference to the drawings. Incidentally, the description will be provided in the following order.

1. Embodiment (retardation film)
2. Application example (display device)

<Embodiment>
[Configuration]

Figure 1A:
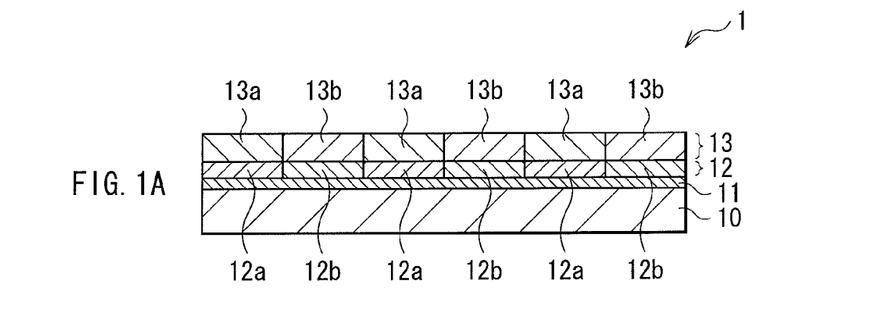
FIGS. 1A and 1B are cross-sectional diagrams that illustrate an example of the configuration of a retardation film according to an embodiment.
Figure 1B:
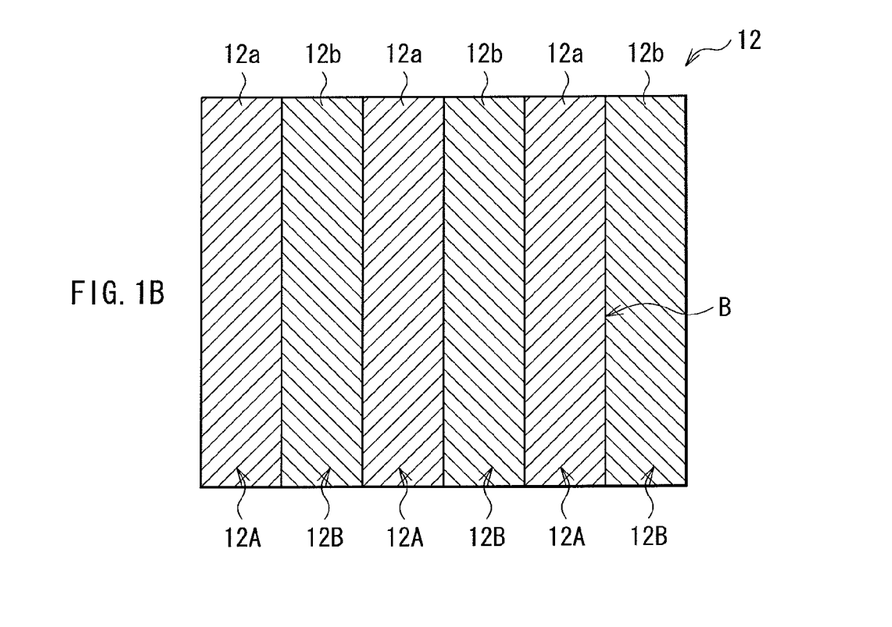

FIG. 1A illustrates an example of a cross-sectional structure of a retardation film 1 according to an embodiment. FIG. 1B is a diagram in which an alignment film 13 in FIG. 1A is viewed from the front-surface side. The retardation film 1 is configured, for example, as illustrated in FIG. 1A, such that on a base 10, an anchor layer 11, an alignment film 12, and a phase difference layer 13 are laminated in this order from the base 10 side.

The base 10 is made of a thermoplastic norbornene resin film. This thermoplastic norbornene resin film is excellent in dimensional stability, and hardly expands and shrinks due to an external environment. As a film equivalent to the thermoplastic norbornene resin film among films available on the market, there is, for example, ZEONOR (registered trademark) made by ZEON CORPORATION.

The anchor layer 11 is an adhesive layer for causing the alignment film 12 to adhere to the base 10 firmly. The anchor layer 11 adheres to the base 10 firmly, and is excellent in adhesion with the alignment film 12. As will be described later, the anchor layer 11 is formed by applying an anchor material including a tri-, or more-functional acrylate monomer of 50 parts by weight or more and 90 parts by weight or less onto the base 10 and then, drying and curing (undergo polymerization) the same. Therefore, the anchor layer 11 hardly contains the acrylate monomer that is a raw material. However, when the anchor layer 11 is subjected to an IR (infrared absorption spectrometry) spectrum analysis, a small amount of acrylic component remaining in the anchor layer 11 is detected. Incidentally, the raw material of the anchor layer 11 will be described later in detail when the description of a production method is provided.

The alignment film 12 is intended to orient a liquid crystal monomer that is a raw material of the phase difference layer 13 in a production process. The alignment film 12 is formed on the base 10 via the anchor layer 11, and has two kinds of groove regions 12a and 12b on its surface. The groove regions 12a and 12b are, for example, as illustrated in FIG. 1B, each shaped like a strip and are arranged alternately in a direction intersecting an extension direction of the groove regions 12a and 12b. The stripe width of these groove regions 12a and 12b is, for example, equal to a pixel pitch in a display device (described later).

The groove region 12a is configured to include plural grooves 12A extending in the same direction. Each of the grooves 12A extends, for example, in a direction intersecting the extension direction of the groove region 12a at an angle other than 90 degrees. The groove region 12b is configured to include plural grooves 12b extending in the same direction. Each of the grooves 12B extends, for example, in a direction that intersects the extension direction of the groove region 12b at an angle other than 90 degrees and is also different from the extension direction of the groove region 12a. For example, as illustrated in FIG. 1B, the extension direction of the groove 12A and the extension direction of the groove 12B intersect each other at right angles, and the groove regions 12a and 12b in contact with a border B between the groove region 12a and the groove region 12b extend in directions linearly symmetric with respect to the border B.

The phase difference layer 13 is formed to be in contact with the groove regions 12a and 12b of the alignment film 12. The phase difference layer 13 is a layer in which strip-shaped phase difference regions 13a and 13b are arranged alternately. The phase difference region 13a is formed to be in contact with the groove region 12a, and the phase difference region 13b is formed to be in contact with the groove region 12b. The phase difference regions 13a and 13b have phase difference properties different from each other. Specifically, the phase difference region 13a has an optical axis in the extension direction of the groove 12A, and the phase difference region 13b has an optical axis in the extension direction of the groove 12B.

The phase difference layer 13 is, for example, configured to include a polymerized polymeric liquid crystal material. In other words, in the phase difference layer 13, an oriented state of liquid crystal molecules (not illustrated) is fixed. As the polymeric liquid crystal material, there is used a material selected according to a phase transition temperature (liquid crystal phase—isotropic phase), a refractive index wavelength dispersion property of the liquid crystal material, a viscous property, a process temperature and the like. However, it is desirable that the material have an acryloyl group or a methacryloyl group as a polymerization group from the viewpoint of transparency. In addition, it is preferable to use a material having no methylene spacer between a polymeric functional group and a liquid crystal skeleton. This is because an orientation processing temperature at the time of the process can be made low. The thickness of this phase difference layer 13 is, for example, in a range of 0.1 μm to 10 μm. Incidentally, when the phase difference layer 13 is configured to include the polymerized polymeric liquid crystal material, there is no need to configure the phase difference layer 13 only with the polymerized polymeric liquid crystal material, and the phase difference layer 13 may include a non-polymerized liquid crystal monomer in part. This is because the non-polymerized liquid crystal monomer included in the phase difference layer 13 is oriented, by the orientation processing (heat treatment) to be described later, in the same direction as the orientation direction of surrounding liquid crystal molecules (not illustrated), and thus has the same orientation property as the orientation property of the polymeric liquid crystal material.

Near the interface between the groove region 12a and the phase difference region 13a, the major axis of the liquid crystal molecules extends in the extension direction of the groove 12A. Further, the liquid crystal molecules in an upper layer of the phase difference region 13a are similarly oriented in the orientation direction of the liquid crystal molecules in a lower layer. In other words, by the shape of the groove 12A extending in a predetermined direction in the groove region 12a, the orientation of the liquid crystal molecules is controlled, and the optical axis of the phase difference region 13a is set. Similarly, near the interface between the groove region 12b and the phase difference region 13b, the major axis of the liquid crystal molecules extends in the extension direction of the groove 12B. Further, the liquid crystal molecules in an upper layer of the phase difference region 13b are similarly oriented in the orientation direction of the liquid crystal molecules in a lower layer. In other words, by the shape of the groove 12B extending in a predetermined direction in the groove region 12b, the orientation of the liquid crystal molecules is controlled, and the optical axis of the phase difference region 13b is set.

Further, in the phase difference layer 13, by adjusting the constituent materials and the thicknesses of the phase difference regions 13a and 13b, the retardation value of the phase difference layer 13 is set. When the base 10 has a phase difference, it is desirable to set this retardation value of the phase difference layer 13 by taking this phase difference of the base 10 into consideration.

[Production Method]

Next, an example of the method of producing the retardation film 1 of the present embodiment will be described. FIG. 2A to FIG. 2D illustrate an example of the production process of the retardation film 1.

First, by a melting extrusion process, a thermoplastic norbornene resin film having a width of 1,350 mm and a thickness of 100 μm is fabricated. In the following, this is used as the base 10. Subsequently, a material to be used as an anchor material 11D is prepared. Specifically, as the anchor material 11D, there is used a resin material including a tri- or more-functional acrylate monomer of 50 parts by weight or more and 90 parts by weight or less. To be more specific, as the anchor material 11D, there is used the resin material including the tri- or more-functional acrylate monomer of 50 parts by weight or more and 90 parts by weight or less, an ester resin having excellent compatibility, and a urethane resin that increases the hardness of resin. When the ester resin and the urethane resin are included as other materials, it is desirable that the acrylate monomer included in the anchor material 11D be of 50 parts by weight or more and 65 parts by weight or less. As the anchor material 11D for the thermoplastic norbornene resin film, a material including an acrylate monomer of 60 parts by weight, an ester resin of 20 parts by weight, and a urethane resin of 20 parts by weight is most preferable.

Figure 3:
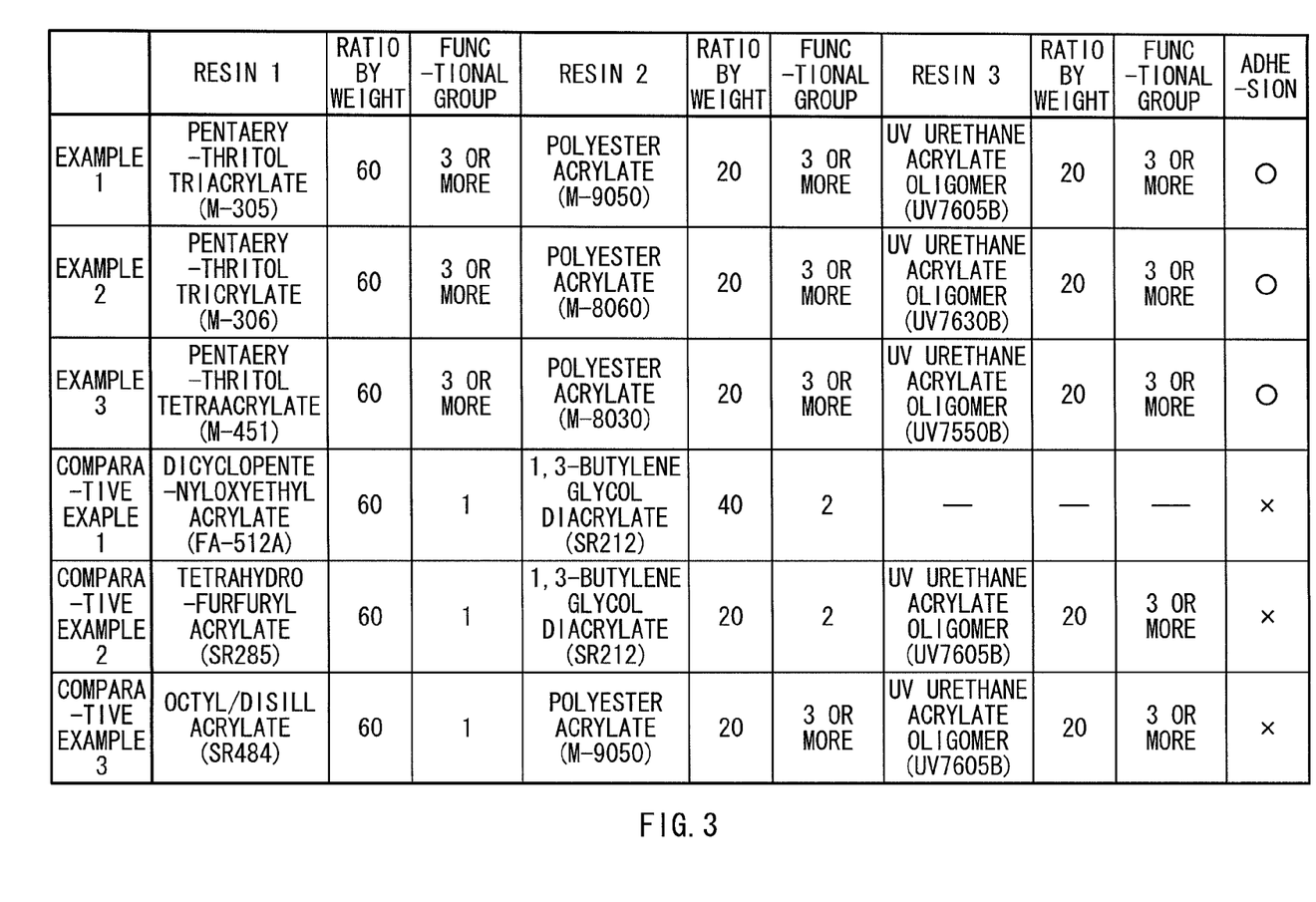
FIG. 3 is a table that illustrates materials used for an anchor material.

As Examples 1, 2 and 3 in FIG. 3, specific examples of the materials included in the anchor material 11D are shown. The anchor material 11D in Example 1 includes pentaerythritol triacrylate (ARONIX M-305 made by TOAGOSEI CO., LTD.) of 60 parts by weight, polyester acrylate (ARONIX M-9050 made by TOAGOSEI CO., LTD.) of 20 parts by weight, UV urethane acrylate oligomer (UV7605B made by Nippon Synthetic Chemical Industry Co., Ltd.) of 20 parts by weight. This anchor material 11D includes, as additives, IRGACURE-184D of 3.5 parts by weight which is a photopolymerization initiator, a leveling agent of 0.01 parts by weight, and butyl acetate of 34 parts by weight.

Further, the anchor material 11D in Example 2 includes pentaerythritol triacrylate (ARONIX M-306 made by TOAGOSEI CO., LTD.) of 60 parts by weight, polyester acrylate (ARONIX M-8060 made by TOAGOSEI CO., LTD.) of 20 parts by weight, and UV urethane acrylate oligomer (UV7630B made by Nippon Synthetic Chemical Industry Co., Ltd.) of 20 parts by weight. This anchor material 11D also includes, as additives, IRGACURE-184D of 3.5 parts by weight which is a photopolymerization initiator, a leveling agent of 0.01 parts by weight, and butyl acetate of 34 parts by weight.

Furthermore, the anchor material 11D in Example 3 includes pentaerythritol tetraacrylate (ARONIX M-451 made by TOAGOSEI CO., LTD.) of 60 parts by weight, polyester acrylate (ARONIX M-8030 made by TOAGOSEI CO., LTD.) of 20 parts by weight, and UV urethane acrylate oligomer (UV7550B made by Nippon Synthetic Chemical Industry Co., Ltd.) of 20 parts by weight. This anchor material 11D also includes, as additives, IRGACURE-184D of 3.5 parts by weight which is a photopolymerization initiator, a leveling agent of 0.01 parts by weight, and butyl acetate of 34 parts by weight.

Figure 2A:
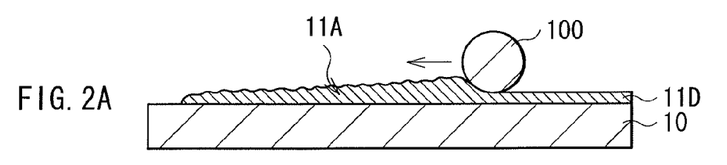
FIGS. 2A and 2B are conceptual diagrams that illustrate an example of a production process of the retardation film in FIG. 1.
Figure 2B:
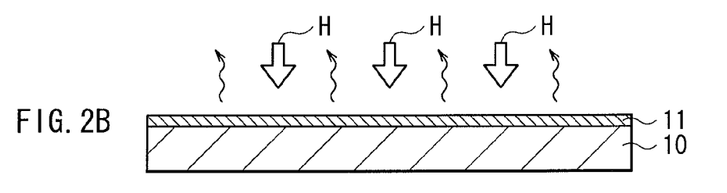
Figure 2C:
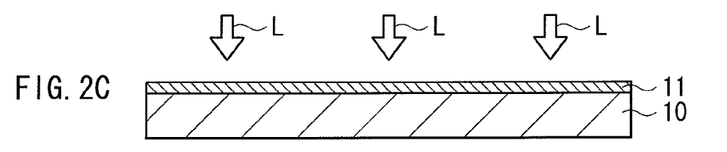

Next, for example, as illustrated in FIG. 2A, by using a bar coater 100, the anchor material 11D (for example, the anchor material configured to include the materials shown in any of Examples 1, 2 and 3 in FIG. 3) is applied onto the base 10. Subsequently, heat H is added to the anchor material 11D on the base 10, and the anchor material 11D is dried (FIG. 2B) and then, the anchor material 11D is irradiated with ultraviolet light L and cured (FIG. 2C). In this way, the anchor layer 11 is formed on the base 10. At the time, the anchor layer 11 adheres to the surface of the base 10 firmly, and does not peal easily.

Incidentally, in Examples 1 to 3 described above, butyl acetate is used as a solvent, but a solvent that does not affect the base 10 may be used in place of butyl acetate. Even in this way, the anchor layer 11 can adhere to the surface of the base 10 firmly. Incidentally, when a solvent causing roughness on the surface of the base 10 such as butyl acetate is used as a solvent, it is possible to cause the anchor layer 11 to adhere to the surface of the base 10 more firmly, by the roughness.

As the solvent causing the roughness on the surface of the base 10, there are, for example, general organic solvents such as acetone, isobutyl alcohol, isopropyl alcohol, isopentyl alcohol, diethyl ether, ethylene glycol, ethylene glycol monoethyl ether, ethylene glycol monoethyl ether acetate, ethylene glycol mono-n-butyl ether, ethylene glycol monomethyl ether, isobutyl acetate, isopropyl acetate, isopentyl acetate, ethyl acetate, cyclohexanone, 1,4-dioxane, tetrahydrofuran, toluene, 1-butanol, methanol, methyl isobutyl ketone, and methyl ethyl ketone, or a mixture of two or more kinds of these solvents, and the like.

Figure 2D:
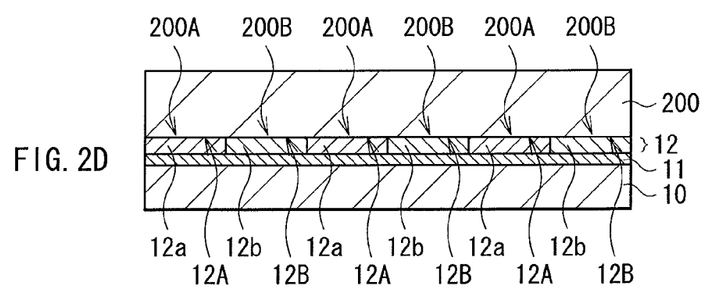

Subsequently, a resin layer 12D is applied onto the anchor layer 11 and then, a master 100, which has groove regions 100a and 100b in inverted shapes of the concave and convex shapes of the groove regions 12a and 12b of the alignment film 12, is pressed against the resin layer 12D (FIG. 2D). In this state, the resin layer 12D is cured (for example, subjected to heat curing, ultraviolet curing), and the shapes of the groove regions 100a and 100b are transferred to the surface of the resin layer 12D. In this way, the alignment film 12 is formed on the anchor layer 11.

Subsequently, although not illustrated, on the surface of the alignment film 12, a liquid crystal layer including a liquid crystal monomer is formed by, for example, coating with a roll coater. At the time, it is desirable to use, as the liquid crystal layer, a high molecular compound having no methylene spacer between a polymeric functional group and a liquid crystal skeleton. In this case, nematic phase is shown at around room temperature and thus, a heating temperature of the orientation processing in a post process can be lowered.

At the time, for the liquid crystal layer, a solvent to dissolve the liquid crystal monomer, a polymerization initiator, a polymerization inhibitor, a surfactant, a leveling agent and the like can be used as needed. As the solvent, although there is no particular limitation, it is desirable to use a solvent whose solubility of the liquid crystal monomer is high, whose vapor pressure at room temperature is low, and which does not easily evaporate at room temperature. As the solvent which does not easily evaporate at room temperature, there are, for example, 1-methoxy-2-acetoxy propane (PGMEA), toluene, methyl ethyl ketone (MEK), methyl isobutyl ketone (MIBK) and the like. This is because when a solvent which easily evaporates at room temperature is used, the evaporation rate of the solvent after the liquid crystal layer is formed by coating is too fast, leading to easy occurrence of disturbance in the orientation of the liquid crystal monomer formed after the evaporation of the solvent.

Subsequently, the orientation processing (heat treatment) of the liquid crystal monomer of the liquid crystal layer applied to the surface of the base 10 is performed. This heat treatment is performed at a temperature equal to or higher than a phase transition temperature (a phase transition temperature between liquid crystal phase and isotropic phase) of the liquid crystal monomer, and when a solvent is used, the heat treatment is performed at a temperature equal to or higher than a temperature at which this solvent dries, for example, 50° C. to 130° C. However, it is important to control the heating rate or holding temperature, time, the cooling rate and the like. For example, when using a liquid crystal layer 12-1 in which a liquid crystal monomer with a phase transition temperature of 52° C. is dissolved in 1-methoxy-2-acetoxy propane (PGMEA) so that a solid part becomes 30% by weight, at first, heating is provided at a temperature, which is equal to or higher than the phase transition temperature (52° C.) of the liquid crystal monomer and at which the solvent dries, for example, around 70° C., and held for about several minutes.

Here, there is a case in which due to the coating of the liquid crystal monomer in the previous process, shear stress acts on the interface between the liquid crystal monomer and a board, causing orientation by flow (flow orientation) and orientation by force (external force orientation), thereby orienting the liquid crystal molecules in an unintended direction. The heat treatment described above is performed to cancel once the oriented state of the liquid crystal monomer that has oriented in such an unintended direction. As a result, in the liquid crystal layer, the solvent dries so that only the liquid crystal monomer remains, and its state becomes the isotropic phase.

Subsequently, gradual cooling is performed up to a temperature slightly lower than the phase transition temperature (52° C.), for example, 47° C., at a rate of around 1 to 5° C./min. In this way, by cooling up to the temperature equal to or lower than the phase transition temperature, the liquid crystal monomer is oriented according to the patterns of the groove regions 12a and 12b formed on the surface of the alignment film 12. In other words, the liquid crystal monomer is oriented along the extension directions of the grooves 12A and 12B.

Subsequently, the liquid crystal layer after the orientation processing is irradiated with, for example, ultraviolet light UV, so that the liquid crystal monomer is polymerized. Incidentally, at this moment, generally, the processing temperature is often around the room temperature, but in order to adjust the retardation value, the temperature may be lowered to the phase transition temperature or lower. In addition, not only the ultraviolet light UV, but heat or electron beam may be used. However, use of the ultraviolet light UV can simplify the process. Thus, the oriented state of the liquid crystal molecules (not illustrated) is fixed along the extension directions of the grooves 12A and 12B, and the phase difference regions 13a and 13b are formed. In this way, the retardation film 1 illustrated in FIG. 1A and FIG. 1B is formed.

Figure 4:
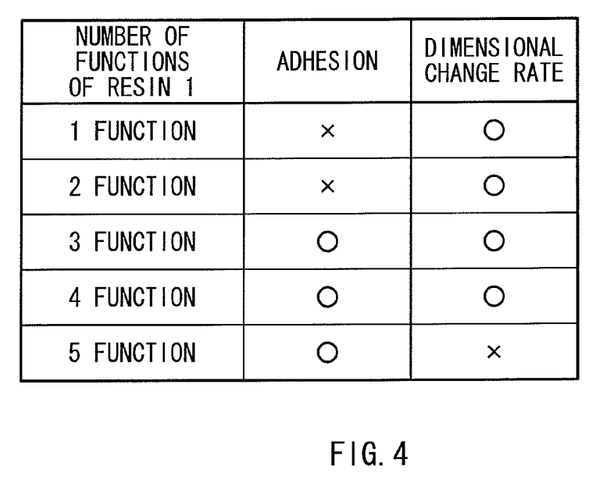
FIG. 4 is a table that indicates an example of the relation between the number of functions and adhesion as well as dimensional change rate.

Next, the relation between the number of functions of the acrylate monomer that is the main raw material of the anchor material 11D and the characteristics (adhesion, dimensional change rate) of the retardation film 1 will be described in comparison with comparative examples. FIG. 4 illustrates the relation between the number of functions of the acrylate monomer that is the main raw material of the anchor material 11D (the number of functions of each of resins enumerated in the column of a resin 1 in FIG. 3) and the characteristics (adhesion, dimensional change rate) of the retardation film 1. As the comparative examples, there are shown three kinds, i.e. Comparative examples 1 to 3 in FIG. 3, of which the number of functions of the acrylate monomer that is the main raw material of the anchor material 11D is 1. Incidentally, FIG. 4 illustrates one in which the number of functions of the acrylate monomer that is the main raw material of the anchor material 11D is 2, but description of specific names of such a material is omitted here. In addition, in FIG. 4, "poor" adhesion means occurrence of peeling, and a "poor" dimensional change rate means formation of a large curl intolerable in practical use.

It is apparent from FIG. 4 that when a mono-, or bi-functional acrylate monomer is mainly included in the anchor material 11D, the cure shrinkage rate of the anchor layer 11 is small and thus, the dimensional change rate of the retardation film 1 is small, but the adhesion between the anchor layer 11 and the base 10 is poor. On the other hand, it is apparent that when a penta- or more-functional acrylate monomer is mainly included in the anchor material 11D, the adhesion between the anchor layer 11 and the base 10 is good, but the cure shrinkage rate of the anchor layer 11 is large, and the dimensional change rate of the retardation film 1 is also large. Therefore, from FIG. 4, it is apparent that the anchor material 11D is desired to mainly include a tri-, or tetra-functional acrylate monomer in terms of the adhesion and the dimensional change rate.

Figure 5:
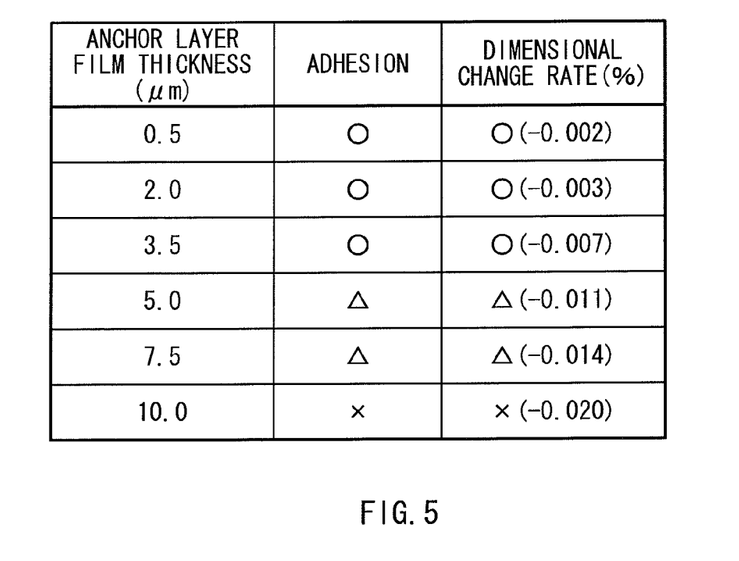
FIG. 5 is a table that indicates an example of the relation between the film thickness of an anchor layer in FIG. 1 and the adhesion as well as the dimensional change rate.

Next, there will be described the relation between the film thickness of the anchor layer 11 and the characteristics (adhesion, dimensional change rate) of the retardation film 1. FIG. 5 illustrates the relation between the film thickness of the anchor layer 11 and the characteristics (adhesion, dimensional change rate) of the retardation film 1.

Incidentally, in FIG. 5, "excellent" adhesion means that when 100 sheets of the retardation film 1 which are the same in terms of the film thickness of the anchor layer 11 are prepared, there is no sheet in which peeling has occurred. Further, "fair" adhesion means that when 100 sheets of the retardation film 1 which are the same in terms of the film thickness of the anchor layer 11 are prepared, peeling has not occurred in a range of 30 to 80 sheets both inclusive. Furthermore, "poor" adhesion means that when 100 sheets of the retardation film 1 which are the same in terms of the film thickness of the anchor layer 11 are prepared, there is no sheet in which peeling has not occurred.

In addition, in FIG. 5, an "excellent" dimensional change rate means a change rate in such a level that no adjustment is necessary at the time of implementation in the display device. Further, a "fair" dimensional change rate means a small change rate in a level of being addressable sufficiently by a slight adjustment at the time of implementation in the display device. Furthermore, a "poor" dimensional change rate means a change rate in a level of requiring a great adjustment at the time of implementation in the display device.

From FIG. 5, it is apparent that when the film thickness of the anchor layer 11 is 0.5 μm or more and 7.5 μm or less, both the adhesion and the dimensional change rate are in an acceptable range. In addition, it is apparent that when the film thickness of the anchor layer 11 is 0.5 μm or more and 3.5 μm or less, both the adhesion and the dimensional change rate are extremely good.

[Effect]

In the embodiment, on the thermoplastic norbornene resin film serving as the base 10, the anchor material 11D including the tri- or more-functional acrylate monomer of 50 parts by weight or more and 90 parts by weight or less is applied and then, the anchor material 11D is dried and cured, so that the anchor layer 11 is formed.

And then, the alignment film 12 and the phase difference layer 13 are formed on the anchor layer 11. Thus, the alignment film 12 firmly adheres to the thermoplastic norbornene resin film. Therefore, even when the alignment film 12 is formed of a material hard to adhere to the thermoplastic norbornene resin film, the alignment film 12 can be caused to firmly adhere to the thermoplastic norbornene resin film via the anchor layer 11. As a result, it is possible to reduce peeling of the alignment film 12 and a great change in the dimensions of the retardation film 1. Therefore, the retardation film 1 using the thermoplastic norbornene resin film as the base 10 can be realized.

APPLICATION EXAMPLE

Figure 6:
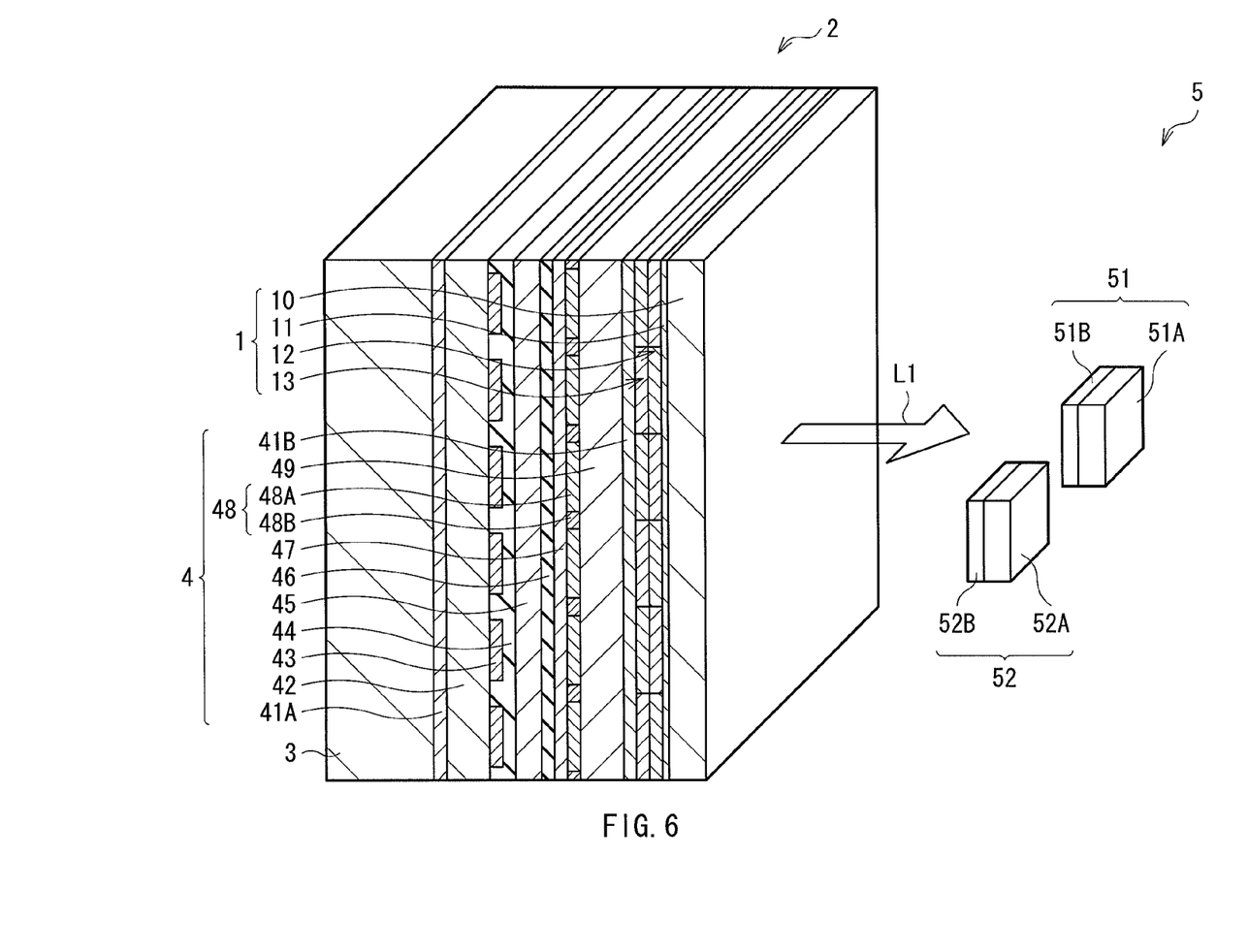
FIG. 6 is a diagram that illustrates an example of a configuration including a display device serving as an application example of the retardation film in FIG. 1 and polarizing glasses.

FIG. 6 illustrates an example of the configuration of a display device 2 according to an application example of the retardation film 1 of the embodiment described above. The display device 2 is a display device that employs a polarizing glass method and displays a stereoscopic image to a viewer (not illustrated) wearing polarizing glasses 5 to be described later placed in front of the eyeballs. This display device 2 is configured such that a backlight unit 3, a display panel 4 and the retardation film 1 are laminated in this order. In this display device 2, the retardation film 1 is affixed to a light emitting surface of the display panel 4. The surface of the retardation film 1 is an image display surface and directed to the viewer side.

Incidentally, in the present application example, the display device 2 is located so that the image display surface is parallel to a vertical (vertical plane). The image display surface is rectangular, and the longitudinal direction of the image display surface is parallel to a horizontal direction. The viewer wears the polarizing glasses 5 in front of the eyeballs, and views the image display surface. The polarizing glasses 5 are of a circularly-polarizing type, and the display device 2 is for circularly-polarizing glasses.

[Backlight Unit 3]

The backlight unit 3 has, for example, a reflector, a light source and an optical sheet (all not illustrated). The reflector sends light emitted from the light source back to the optical sheet side, and has functions such as reflection, dispersion and diffusion. This reflector is made of, for example, foamed PET (polyethylene terephthalate) and the like. This makes it possible to use the light emitted from the light source effectively. The light source illuminates the display panel 4 from back, and is configured, for example, such that plural linear light sources are arranged parallel to each other at regular intervals, or plural spot light sources are arranged two-dimensionally. Incidentally, as the linear light source, there are Hot Cathode Fluorescent Lamp (HCFL), Cold Cathode Fluorescent Lamp (CCFL) and the like. Further, as the spot light source, there are Light Emitting Diode (LED) and the like. The optical sheet equalizes the in-plane luminance distribution of the light from the light source, and adjusts the divergence angle or polarization of the light from the light source to fall in a desired range. The optical sheet is configured to include a diffuser, a diffusion sheet, a prism sheet, a reflecting polarizer, a retardation film and the like.

[Display Panel 4]

The display panel 4 is a transmissive display panel in which plural pixels are arranged two-dimensionally in rows and columns, and displays an image by driving each pixel according to an image signal. This display panel 4 includes, as illustrated in FIG. 6, for example, a polarizing plate 41A, a transparent substrate 42, pixel electrodes 43, an alignment film 44, a liquid crystal layer 45, an alignment film 46, a common electrode 47, a color filter 48, a transparent substrate 49 and a polarizing plate 41B, arranged sequentially from the backlight unit 3 side.

Here, the polarizing plate 41A is disposed on the light entering side of the display panel 4, and the polarizing plate 41B is disposed on the light emitting side of the display panel 4. The polarizing plates 41A and 41B are a kind of optical shutter, and pass only the light (polarized light) in a certain oscillation direction. The polarizing plates 41A and 41B are disposed, for example, to have the respective polarizing axes different from each other by only a predetermined angle (for example, 90 degrees), so that the light emitted from the backlight unit 3 passes through via the liquid crystal layer or is blocked.

The direction of the transmission axis (not illustrated) of the polarizing plate 41A is set in a range of enabling the light emitted from the backlight unit 3 to pass through.

For example, when the polarizing axis of the light emitted from the backlight unit 3 is in the vertical direction, the transmission axis of the polarizing plate 41A is also directed to the vertical direction. Further, for example, when the polarizing axis of the light emitted from the backlight unit 3 is in the horizontal direction, the transmission axis of the polarizing plate 41A also is directed to the horizontal direction. Incidentally, the light emitted from the backlight unit 3 is not limited to linearly polarized light, and may be circularly polarized light or elliptically polarized light, or may be unpolarized.

The direction of the polarizing axis (not illustrated) of the polarizing plate 41B is set in a range of enabling transmission of the light that has passed through the display panel 4. For example, when the direction of the polarizing axis of the polarizing plate 41A is in the horizontal direction, the polarizing axis of the polarizing plate 41B is directed to a direction (horizontal direction) orthogonal to that direction, and when the polarizing axis of the polarizing plate 41A is in the vertical direction, the direction of the polarizing axis of the polarizing plate 41B is directed to a direction (horizontal direction) orthogonal to that direction.

Generally, the transparent substrates 42 and 49 are transparent with respect to visible light. Incidentally, in the transparent substrate on the backlight unit 3 side, there is formed, for example, an active type driving circuit that includes a TFT (Thin Film Transistor) serving as a driving element electrically connected to each of the transparent pixel electrodes, and wiring etc. The pixel electrodes 43 are disposed, for example, in a plane of the transparent substrate 42 in rows and columns. This pixel electrode 43 is made of, for example, Indium Tin Oxide (ITO), and functions as an electrode for each pixel. The alignment film 44 is made of, for example, a high polymer material such as polyimide, and applies orientation processing to the liquid crystal. The liquid crystal layer 45 is made of, for example, a liquid crystal in VA (Vertical Alignment) mode. This liquid crystal layer 45 has a function of transmitting or blocking, for each pixel, the light emitted from the backlight unit 3, by a voltage applied from the driving circuit not illustrated. The common electrode 47 is made of, for example, ITO, and functions as a common counter electrode. The color filter 48 is formed, for example, by arranging filter sections 48A for dividing the color of the light emitted from the backlight unit 3 into three primary colors of red (R), green (G) and blue (B). In this color filter 48, the filter sections 48A are provided with black matrix sections 48B with shading function, at portions each corresponding to the border between the pixels.

[Retardation Film 1]

Next, the retardation film 1 will be described. The retardation film 1 is a film that changes the polarization of the light that has passed through the polarizing plate 41B of the display panel 4. As illustrated in FIG. 6, this retardation film 1 has, for example, the base 10, the anchor layer 11, the alignment film 12 and the phase difference layer 13 from the light emitting side sequentially.

The slow axis of the base 10 is, for example, directed to the horizontal direction or the vertical direction. The phase difference layer 13 is a thin layer having optical anisotropy. This phase difference layer 13 has two kinds of phase difference regions (the phase difference regions 13a and 13b) mutually different in terms of the direction of the slow axis.

As illustrated in FIG. 6, for example, the phase difference regions 13a and 13b are shaped like strips extending in a single common direction (horizontal direction). These phase difference regions 13a and 13b are arranged in the in-plane direction of the base 10 regularly next to each other, and specifically, arranged alternately in the transverse direction (vertical direction) of the phase difference regions 13a and 13b. Therefore, the border (not illustrated) where the phase difference regions 13a and 13b are next to (in contact with) each other is directed to the same direction as the longitudinal direction (horizontal direction) of the phase difference regions 13a and 13b. In addition, the phase difference regions 13a and 13b are disposed to correspond to the arrays of the pixel electrodes 43.

The slow axes of the phase difference regions 13a and 13b are, for example, directed to the direction intersecting both the horizontal direction and the vertical direction, and also directed to the direction intersecting the slow axis of the base 10. The slow axes of the phase difference regions 13a and 13b are also directed to the direction intersecting the polarizing axis of the polarizing plate 41B of the display panel 4. Further, the slow axis of the phase difference region 13a is directed to the same direction as the direction of the slow axis of a right-eye retardation film 51B of the polarizing glasses 5 to be described later, or directed to a direction corresponding to that direction. The slow axis of the phase difference region 13a is directed to the direction different from the direction of the slow axis of a left-eye retardation film 52B. On the other hand, the slow axis of the phase difference region 13b is directed to the same direction as the direction of the slow axis of the left-eye retardation film 52B of the polarizing glasses 5 to be described later, or a direction corresponding to that direction. The slow axis of the phase difference region 13b is directed to the direction different from the direction of the slow axis of the right-eye retardation film 51B.

[Polarizing Glasses 5]

Next, the polarizing glasses 5 will be described. The polarizing glasses 5 are placed in front of the eyeballs of the viewer (not illustrated), and used by the viewer in viewing an image appearing on the image display surface. The polarizing glasses 5 include, for example, as illustrated in FIG. 6, a right-eye glass 51 and a left-eye glass 52.

The right-eye glass 51 and the left-eye glass 52 are positioned to face the image display surface of the display device 2. Incidentally, as illustrated in FIG. 6, it is desirable that the right-eye glass 51 and the left-eye glass 52 be positioned in a single horizontal plane if possible, but may be positioned a flat plane inclined to some extent.

The right-eye glass 51 has, for example, a polarizing plate 51A and the right-eye retardation film 51B. On the other hand, the left-eye glass 52 has, for example, a polarizing plate 52A and the left-eye retardation film 52B. The right-eye retardation film 51B is the surface of the polarizing plate 51A and disposed on the light entering side. The left-eye retardation film 52B is the surface of the polarizing plate 52A and disposed on the light entering side The polarizing plates 51A and 52A are disposed on the light emitting side of the polarizing glasses 5, and pass only the light (polarized light) in a certain oscillation direction. Each of the polarizing axes of the polarizing plates 51A and 52A is directed to a direction orthogonal to the polarizing axis of the polarizing plate 41B. The polarizing axes of the polarizing plates 51A and 52A are: directed to the horizontal direction when the polarizing axis of the polarizing plate 41B is directed to the vertical direction; and directed to the vertical direction when the polarizing axis of the polarizing plate 41B is directed to the horizontal direction.

The right-eye retardation film 51B and the left-eye retardation film 52B are thin layers having optical anisotropy. The slow axis of the right-eye retardation film 51B and the slow axis of the left-eye retardation film 52B are directed to the direction intersecting both the horizontal direction and the vertical direction, and also directed to the direction intersecting the polarizing axes of the polarizing plates 51A and 52A. Further, the polarizing axis of the polarizing plate 51A is directed to the same direction as the direction of the slow axis of the phase difference region 13a, or directed to a direction corresponding to that direction, and is directed to the direction different from the direction of the slow axis of the phase difference region 13b. On the other hand, the slow axis of the polarizing plate 52A is directed to the same direction as the direction of the slow axis of the phase difference region 13b, or directed to a direction corresponding to that direction, and is directed to the direction different from the direction of the slow axis of the phase difference region 13a.

[Method of Producing Display Device 2]

Next, an example of the method of producing the display device 2 will be described. First, there is prepared a laminate (not illustrated) that includes the transparent substrate 42, the pixel electrodes 43, the alignment film 44, the liquid crystal layer 45, the alignment film 46, the common electrode 47, the color filter 48 and the transparent substrate 49 in this order. Subsequently, the polarizing plate 41A is affixed to the back surface (a surface on the transparent substrate 42 side) of this laminate, and the polarizing plate 41B is affixed to the surface (a surface on the transparent substrate 49 side) of this laminate. In this way, the display panel 4 is completed. Subsequently, the retardation film 1 is affixed onto the polarizing plate 41B and then, the backlight unit 3 is attached to the back surface of the display panel 4 (on the polarizing plate 41A side). In this way, the display device 2 is completed.

Subsequently, in the production method described above, an example of the process of affixing the retardation film 1 and the display panel 4 to each other will be described in detail. Incidentally, this production process is used when some expansion and shrinkage is seen in the retardation film 1. Therefore, there is no need to apply the following production process when dimensional stability of the retardation film 1 is extremely high.

First, the display panel 4 and a retardation film 1 for evaluation (namely, to serve as a reference), or the display panel 4 and the retardation film 1 before affixing are prepared (not illustrated). Subsequently, in these display panel 4 and retardation film 1, the arrangement pitch of the pixel electrodes 43 and the arrangement pitch of the phase difference regions 13a and 13b are measured (not illustrated). These arrangement pitches are obtained by, for example, taking an image of the surfaces of the display panel 4 and the retardation film 1 with an imaging device, and processing the taken image with the imaging device. The humidity at the time of the measurement is set to, for example, a standard humidity (e.g., 45% RH). In addition, the temperature at the time of the measurement is set to, for example, 22.5° C.

Subsequently, measured values are stored in a control device (not illustrated) of controlling the temperature and the humidity in a temperature humidity control room (not illustrated) to be described later. The storage of the measured values may be carried out by the input of the measured values into the control device by a person, or may be performed by the transfer of the measured values to the control device by the imaging device that has measured the arrangement pitches.

This control device has, although not illustrated, for example, a control section of controlling the temperature and the humidity in the temperature humidity control room, a storage section, and an input section of accepting information. The storage section is intended to store the information accepted by the input section. In the storage section, for example, data D for misalignment correction and a calculation formula for temperature humidity correction are stored, and after the above-described measurement is performed, the measured values of the arrangement pitches are also stored. The control device derives a to-be-set humidity of the temperature humidity control room based on the calculation formula for temperature humidity correction, by using the stored measured values and the data D for misalignment correction, and sets the humidity in the temperature humidity control room to the derived humidity.

Here, the data D includes, for example, a temperature expansion coefficient and a humidity expansion coefficient of the retardation film 1. The calculation formula for temperature humidity correction is provided, for example, to derive what temperature and humidity the temperature humidity control room should be, in order to make the arrangement pitch of the retardation film 1 and the arrangement pitch of the display panel 4 equal to each other.

Subsequently, only the retardation film 1 before affixing is left in the temperature humidity control room for a predetermined time. As a result, the arrangement pitch of the retardation film 1 and the arrangement pitch of the display panel 4 become equal to each other. In other words, the control device controls the temperature and the humidity of an atmosphere around the retardation film 1 so that the respective arrangement pitches become equal to each other.

Then, in the atmosphere where the humidity is controlled (in other words, in the temperature humidity control room), or immediately after the retardation film 1 is taken out of the temperature humidity control room, the display panel 4 and the retardation film 1 are affixed to each other. In this way, the retardation film 1 and the display panel 4 of the present embodiment are affixed to each other.

Incidentally, in the above-described production process, after only the retardation film 1 for evaluation or the retardation film 1 before affixing is prepared, only the arrangement pitch of the phase difference regions 13a and 13b may be measured in the retardation film 1, and the measured value may be stored in the storage section. In this case, instead of measuring the arrangement pitch of the display panel 4, a design value of the arrangement pitch of the phase difference regions 13a and 13b is stored in the storage section of the control device as one piece of the data D for misalignment correction. And, by using the stored measured value and the data D for misalignment correction, the control device may derive a to-be-set humidity of the temperature humidity control room based on the calculation formula for temperature humidity correction, and set the derived humidity as the humidity of the temperature humidity control room.

[Operation]

In the display device 2 according to the application example, first, in a state in which the light emitted from the backlight unit 3 is incident on the display panel 4, parallax signals including an image for the right eye and an image for the left eye are input into the display panel 4 as image signals. Then, image light for the right eye is output from the pixels in odd-numbered lines, and image light for the left eye is output from the pixels in even-numbered lines. Subsequently, the image light for the right eye and the image light for the left eye are converted into elliptically polarized light by the phase difference regions 13a and 13b of the retardation film 1 and then, output to the outside from the image display surface of the display device 2.

Subsequently, light $L_1$ output to the outside of the display device 2 enters the polarizing glasses 5, and after being returned from the elliptically polarized light to the linearly polarized light by the right-eye retardation film 51B and the left-eye retardation film 52B, enters the polarizing plates 51A and 52A of the polarizing glasses 5. At the time, of the light entering the polarizing plates 51A and 52A, light corresponding to the image light for the right eye has the polarizing axis parallel to the polarizing axis of the polarizing plate 51A and orthogonal to the polarizing axis of the polarizing plate 52A. Therefore, of the light entering the polarizing plates 51A and 52A, the light corresponding to the image light for the right eye passes through only the polarizing plate 51A, and reaches the right eye of the viewer. On the other hand, of the light entering the polarizing plates 51A and 52A, light corresponding to the image light for the left eye has the polarizing axis orthogonal to the polarizing axis of the polarizing plate 51A and parallel to the polarizing axis of the polarizing plate 52A. Therefore, of the light entering the polarizing plates 51A and 52A, the light corresponding to the image light for the left eye passes through only the polarizing plate 52A, and reaches the left eye of the viewer.

In this way, as a result of arrival of the light corresponding to the image light for the right eye at the right eye of the viewer, and arrival of the light corresponding to the image light for the left eye at the left eye of the viewer, the viewer can see as if a stereoscopic image is displayed on the image display surface of the display device 2.

[Effect]

Incidentally, in the application example, in the retardation film 1, the thermoplastic norbornene resin film that is the base 10 and the alignment film 12 firmly adhere to each other via the anchor layer 11. This makes it possible to reduce a possibility that the alignment film 12 might peel and the dimensions of the retardation film 1 might change greatly. In particular, high dimensional stability of the retardation film 1 is maintained and therefore, the display panel 4 and the retardation film 1 can be affixed to each other with high precision, without using the production process described above. In addition, even when some expansion and shrinkage is seen in the retardation film 1, the display panel 4 and the retardation film 1 can be affixed to each other with high precision, by using the production process described above.

<Modification>

[First Modification]

In the application example described above, the retardation film 1 is provided on the image display surface side of the display device 2, but may be provided in other locations. For example, although not illustrated, the retardation film 1 may be provided between the polarizing plate 41A and the transparent substrate 42. The display device 2 according to the present modification can be produced in the following manner. First, there is prepared a laminate (not illustrated) that includes the transparent substrate 42, the pixel electrodes 43, the alignment film 44, the liquid crystal layer 45, the alignment film 46, the common electrode 47, the color filter 48 and the transparent substrate 49 in this order. Subsequently, the retardation film 1 is affixed to the back surface (the surface on the transparent substrate 42 side) of this laminate and then, the polarizing plate 41A is affixed onto the retardation film 1. Next, the polarizing plate 41B is affixed to the surface (the surface on the transparent substrate 49 side) of the laminate. In this way, the display panel 4 including the retardation film 1 is completed. Subsequently, the backlight unit 3 is attached to the back surface of the display panel 4 (the polarizing plate 41A side). In this way, the display device 2 according to the present modification is completed.

In the display device 2 according to the present modification, when the light emitted from the backlight unit 3 enters the polarizing plate 41A, only a polarized component in the horizontal direction passes through, and enters the retardation film 1. The light that has passed through the retardation film 1 transmits the laminate and the polarizing plate 41B sequentially, and is emitted as a polarized component in the vertical direction. This results in two-dimensional display. Here, since the retardation film 1 is disposed, a phase difference of the liquid crystal when viewed from an oblique direction is compensated for, and therefore leakage of light and coloring in the oblique direction in the case of black display can be reduced. In other words, the retardation film 1 can be used as a viewing angle compensation film such as A plate and C plate.

[Second Modification]

Further, in the above-described embodiment, the case in which the phase difference regions 13a and 13b of the retardation film 1 extend in the horizontal direction has been taken as an example, but the phase difference regions 13a and 13b may extend in other direction.

[Third Modification]

Furthermore, in the above-described embodiment and the modifications, the case in which the phase difference regions 13a and 13b of the retardation film 1 extend in the horizontal direction or the vertical direction of the retardation film 1 entirely has been taken as an example, but the phase difference regions 13a and 13b may be, for example, arranged two-dimensionally in both the horizontal direction and the vertical direction.

[Fourth Modification]

Moreover, in the above-described embodiment and the modifications, the case in which the retardation film 1 is applied to the display device 2 has been taken as an example, but the retardation film 1 can be, of course, applied to other devices.

[Fifth Modification]

Up to this point, the case in which the polarizing glasses 5 are of the circularly-polarizing type, and the display device 2 is the display device for the circularly-polarizing glasses has been described. However, the present invention can be applied to a case in which the polarizing glasses 5 are of a linearly-polarizing type, and the display device 2 is a display device for linearly-polarizing glasses.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A retardation film wherein:
a thermoplastic norbornene resin film, an anchor layer, an alignment film and a phase difference layer are laminated in this order; and
the anchor layer is formed by applying an anchor material including a tri-, or more-functional acrylate monomer of 50 parts by weight or more and 90 parts by weight or less onto the thermoplastic norbornene resin film and then, drying and curing the anchor material with ultraviolet light.

2. The retardation film according to claim 1, wherein the anchor layer is formed by applying the anchor material including, in addition to the acrylate monomer, an ester resin and a urethane resin onto the thermoplastic norbornene resin film, and drying and curing the anchor material with ultraviolet light.

3. The retardation film according to claim 1, wherein the anchor layer has a thickness of 0.5 µm or more and 7.5 µm or less.

4. The retardation film according to claim 3, wherein the anchor layer has a thickness of 0.5 µm or more and 3.5 µm or less.

5. A display device comprising:
a display panel in which a plurality of pixel electrodes are arranged in rows and columns; and
a retardation film affixed to the display panel,
wherein the retardation film is formed by laminating a thermoplastic norbornene resin film, an anchor layer, an alignment film and a phase difference layer in this order, and
the anchor layer is formed by applying an anchor material including a tri-, or more-functional acrylate monomer of 50 parts by weight or more and 90 parts by weight or less onto the thermoplastic norbornene resin film and then, drying and curing the anchor material with ultraviolet light.

6. A method of producing a retardation film, the method comprising:
a first step of forming an anchor layer by applying an anchor material including a tri-, or more-functional acrylate monomer of 50 parts by weight or more and 90 parts by weight or less onto a thermoplastic norbornene resin film and then, drying and curing the anchor material with ultraviolet light; and
a second step of forming an alignment film and a phase difference layer in this order on the anchor layer.

7. The method of producing the retardation film according to claim 6, wherein the anchor material includes, in addition to the acrylate monomer, an ester resin and a urethane resin.

8. The method of producing the retardation film according to claim 7, wherein the anchor material includes the acrylate monomer of 60 parts by weight, the ester resin of 20 parts by weight and the urethane resin of 20 parts by weight.

* * * * *